United States Patent
Feierbach (10) Patent No.: US 6,642,947 B2
(45) Date of Patent: Nov. 4, 2003

(54) METHOD AND APPARATUS FOR DYNAMIC CURSOR CONFIGURATION

(75) Inventor: Gary F. Feierbach, Belmont, CA (US)

(73) Assignee: Apple Computer, Inc., Cupertino, CA (US)

( * ) Notice: Subject to any disclaimer, the term of this patent is extended or adjusted under 35 U.S.C. 154(b) by 117 days.

(21) Appl. No.: 09/810,371

(22) Filed: Mar. 15, 2001

(65) Prior Publication Data

US 2002/0130838 A1 Sep. 19, 2002

(51) Int. Cl.$^7$ ................................................. G09G 5/00
(52) U.S. Cl. ...................... 345/861; 345/156; 345/157; 345/159; 345/160; 345/856; 345/857
(58) Field of Search ............................... 345/156–160, 345/666–671, 857–861, 619, 636

(56) References Cited

U.S. PATENT DOCUMENTS

| | | | |
|---|---|---|---|
| 5,091,866 A | | 2/1992 | Takagi |
| 5,146,212 A | * | 9/1992 | Venolia ...................... 345/861 |
| 5,784,056 A | * | 7/1998 | Nielsen ...................... 345/856 |
| 5,898,432 A | * | 4/1999 | Pinard ........................ 345/861 |
| 6,100,871 A | * | 8/2000 | Min ............................ 345/861 |
| 6,118,449 A | * | 9/2000 | Rosen et al. ................ 345/861 |
| 6,362,842 B1 | * | 3/2002 | Tahara et al. ............... 345/856 |
| 6,441,802 B1 | * | 8/2002 | Tani et al. ................... 345/1.1 |
| 6,466,197 B1 | * | 10/2002 | Kim et al. .................. 345/156 |

FOREIGN PATENT DOCUMENTS

EP  0 595 746 A1  5/1994
GB  2 220 826 A   1/1990

OTHER PUBLICATIONS

IBM Technical Disclosure Bulletin, "Pressure Sensitive Trackball Device," vol. 38, No. 10, Oct. 1995.
Chalidabhongse et al., "A Multiresolution Approach for Image Morphing," Signals, Systems and Computers. 1993 Conference Record of the Twenty–Seventh Asilomar Conference on Pacific Grove, CA, USA, Nov. 1–3, 1993, IEEE Comput. Soc, Nov. 1, 1993, pp. 16–20.
Kline et al., "Improving GUI Accessibility for People with Low Vision," Chi '95 Mosaic of Creativity, Conference on Human Factors in Computing Systems, ACM, May 7–11, 1995, pp. 114–121.
IBM Technical Disclosure Bulletin, "Cursor with Rotating Marquee Edge," vol. 36, No. 2, Feb. 1993.

* cited by examiner

Primary Examiner—Richard Hjerpe
Assistant Examiner—Henry N. Tran
(74) Attorney, Agent, or Firm—Beyer Weaver & Thomas, LLP (57) ABSTRACT

A cursor image on a display is altered in size as a function of the speed (or distance) the cursor is moved across the display to aid a user in locating the cursor on the display. The cursor image may also be altered to further indicate the direction of movement. In one embodiment, the cursor image may grow in size with increasing speed of cursor image movement. In other embodiments, the cursor image may also be additionally altered in form and/or color, flash, or otherwise to thereby visibly indicate its location on the display.

37 Claims, 8 Drawing Sheets

METHOD AND APPARATUS FOR DYNAMIC CURSOR CONFIGURATION

FIELD OF THE INVENTION

The present invention generally relates to computers. More specifically, the present invention relates to computer cursors and graphical position indicators that are presented on display devices.

BACKGROUND OF THE INVENTION

In conventional computer systems, a user can view and interact with information presented on a display (i.e., monitor or display device). Typically, the user is aided in locating their position on the display by a cursor image. Cursor images used during word processing or graphical work tend to be relatively unobtrusive such as a small arrow or flashing line or bars, so as to avoid obstructing the view of the work product being displayed on the display. Unfortunately, when moving these cursor images over a large display or multi-screen displays, it is easy for a user to briefly lose track of the cursor image due to the small size of the cursor image relative to the size of the display(s) or information presented on the display(s). This is often annoying and time consuming for computer users. Simply using a large cursor image to aid in location identification is not a satisfactory solution as such would obscure the information presented on the display device. Consequently, there is a need for techniques that facilitate improved visual tracking of a cursor on a display.

SUMMARY OF THE INVENTION

Broadly speaking, the present invention relates to techniques that facilitate improved visual tracking of a cursor. These techniques use dynamic cursor configurations in which the cursor image is altered as a function of the distance the cursor image is moved on a display over a timed interval, i.e., the speed of cursor movement. To aid a user in locating the cursor image on display(s), the cursor image is altered by increasing the size of the cursor image as the cursor is moved more quickly. Further, the cursor image may be further altered to indicate direction of movement.

The present invention can be implemented in numerous ways, including as a method, system, device, and a computer readable medium. Several embodiments of the invention are discussed below.

As a method for altering a cursor image presented on a display, one embodiment of the present invention includes at least the operations of: determining a first position of a cursor image on a display; initiating a timed interval; determining a second position of the cursor image on the display at the end of the timed interval; determining the distance moved based upon the first position of the cursor image and the second position of the cursor image; and altering the cursor image presented on the display as a function of the distance moved.

As a method for altering a cursor image presented on a display, another embodiment of the present invention includes at least the operations of: determining a first position of the cursor image on a display; initiating a timed interval, the timed interval having a termination; determining a second position of the cursor image on the display at the termination of the timed interval; determining the distance the cursor image is moved from the first position to the second position; determining the speed at which the cursor image is moved from the first position to the second position; and altering the appearance of the cursor image presented on the display as a function of the speed.

As a method for altering a cursor image presented on a display, still another embodiment of the present invention includes at least: determining a first position of the cursor image on a display; initiating a timed interval, the timed interval having a termination; determining a second position of the cursor image on the display at the termination of the timed interval; determining the distance the cursor image is moved from the first position to the second position; determining the direction the cursor image is moved from the first position to the second position; determining the speed at which the cursor image is moved from the first position to the second position; and altering the appearance of the cursor image presented on the display as a function of the speed and direction.

As a method for altering a cursor image presented on a display, yet still another embodiment of the present invention includes at least: determining a first position of a cursor image on a display; initiating a timed interval, the timed interval having a termination; determining a second position of the cursor image on the display at the termination of the timed interval; determining the distance the cursor image is moved from the first position to the second position; determining if the distance moved is greater than a minimum specified value; if the distance moved is greater than the minimum specified value, determining the direction the cursor image is moved from the first position to the second position; determining the speed at which the cursor image is moved from the first position to the second position; and altering the appearance of the cursor image presented on the display as a function of the speed and direction.

As a computer readable medium containing program code for altering a cursor image presented on a display, a further embodiment of the present invention includes instructions for at least: determining a first position of a cursor image on a display; initiating a timed interval, the timed interval having a termination; determining a second position of the cursor image on the display at the termination of the timed interval; determining the distance the cursor image is moved from the first position to the second position; determining the speed at which the cursor image is moved from the first position to the second position; and altering the appearance of the cursor image presented on the display as a function of the speed.

Other advantages of the present invention will become apparent from the following detailed description taken in conjunction with the accompanying drawings that illustrate, by way of example, the principles of the invention.

BRIEF DESCRIPTION OF THE DRAWINGS

The present invention may best be understood by reference to the following description taken in conjunction with the accompanying drawings in which.

DETAILED DESCRIPTION OF THE INVENTION

According to the present invention, dynamic cursor configurations are described. The present invention provides better visual tracking of a cursor on a display by dynamically altering the appearance of the cursor image as it is moved. According to one embodiment, a cursor image can be increased in size as the cursor is moved more quickly on a display and can be decreased in size as the cursor slows. Typically, the cursor image will return to its default or initial size when the cursor image is not moving (e.g., at rest).

Figure 1A:
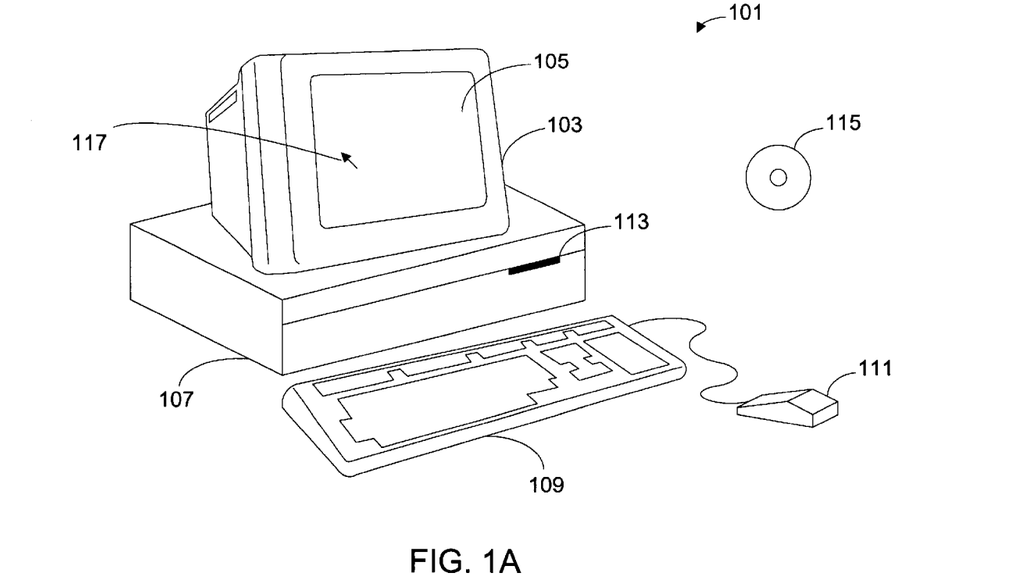
FIGS. 1A and 1B illustrate an example of a computer system that may be used in accordance with the invention to provide alteration of a cursor image presented on a display as a function of the distance moved over a time interval.
Figure 1B:
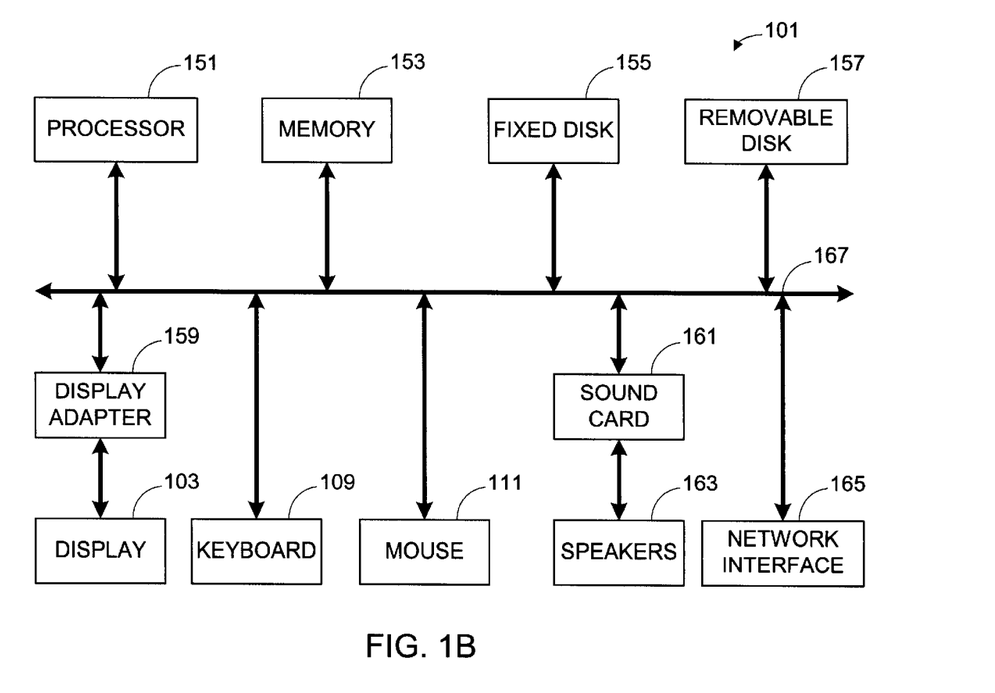

FIGS. 1A and 1B illustrate an example of a computer system that may be used in accordance with the present invention to provide alteration of a cursor image as a function of the distance moved.

FIG. 1A shows a computer system 101 that includes a display monitor 103 having a display 105 (or multiple displays), cabinet 107, keyboard 109, and mouse 111. A cursor image 117 is illustrated on the display 105. The cursor image 117 is typically used for indicating the user's position on the display. Typically the cursor image 117 is moved about the display 105 through user input either through the keyboard 109, mouse 111, or through another device (e.g., button, stylus, input pad or joystick), which can convey cursor image movement and speed. Cabinet 107 houses a drive 113, such as a CD-ROM or floppy drive, system memory and a hard drive (see FIG. 1B) which may be utilized to store and retrieve software programs incorporating computer code that implements the present invention, data for use with the invention, and the like. Although CD-ROM 115 is shown as an exemplary computer readable storage medium, other computer readable storage media including floppy disk, tape, flash memory, system memory, and hard drive may be utilized. Additionally, a data signal embodied in a carrier way (e.g., in a network including the Internet) may be the computer readable storage medium. In one implementation, an operating system for the computer system 101 is provided in the system memory, the hard drive, the CD-ROM 115 or other computer readable storage medium and serves to incorporate the computer code that implements the invention.

FIG. 1B shows a system block diagram of a computer system 101 used to execute the software of an embodiment of the invention. As in FIG. 1A, computer system 101 includes display monitor 103 and keyboard 109, and mouse 111. Computer system 101 further includes subsystems such as a central processor 151, system memory 153, fixed storage 155 (e.g., hard drive), removable storage 157 (e.g., CD-ROM drive), display adapter 159, sound card 161, speakers 163, and network interface 165. The central processor 151 typically includes code for locating the position of the cursor image 117 (or the cursor itself) on the display 105 and for moving the cursor image 117 based upon user inputs to the system 101, e.g., inputs through the mouse 111 or other input device. The presentation of the cursor image 117 on the display 105 may be implemented in a wide variety of ways; and, the computer system 101 may include one or more graphic subsystem(s) for enabling the presentation of the cursor image 117 on the display 105. For example, the central processor 151, may execute computer program code (e.g., an operating system) to implement the invention, and/or may in combination with a graphic subsystem implement the invention. The operating system is normally, but not necessarily, resident in the system memory 153 during its execution. Other computer systems suitable for use with the invention may include additional subsystems or fewer subsystems. For example, another computer system could include more than one processor 151 (i.e., a multi-processor system) or one or more levels of cache memory.

The system bus architecture of computer system 101 is represented by arrows 167. However, these arrows are illustrative of any interconnection scheme serving to link the subsystems. For example, a local bus could be utilized to connect the central processor to the system memory and display adapter. Computer system 101 shown in FIG. 1B is but an example of a computer system suitable for use with the invention. Other computer architectures having different configurations of subsystems may also be utilized.

Figure 2:
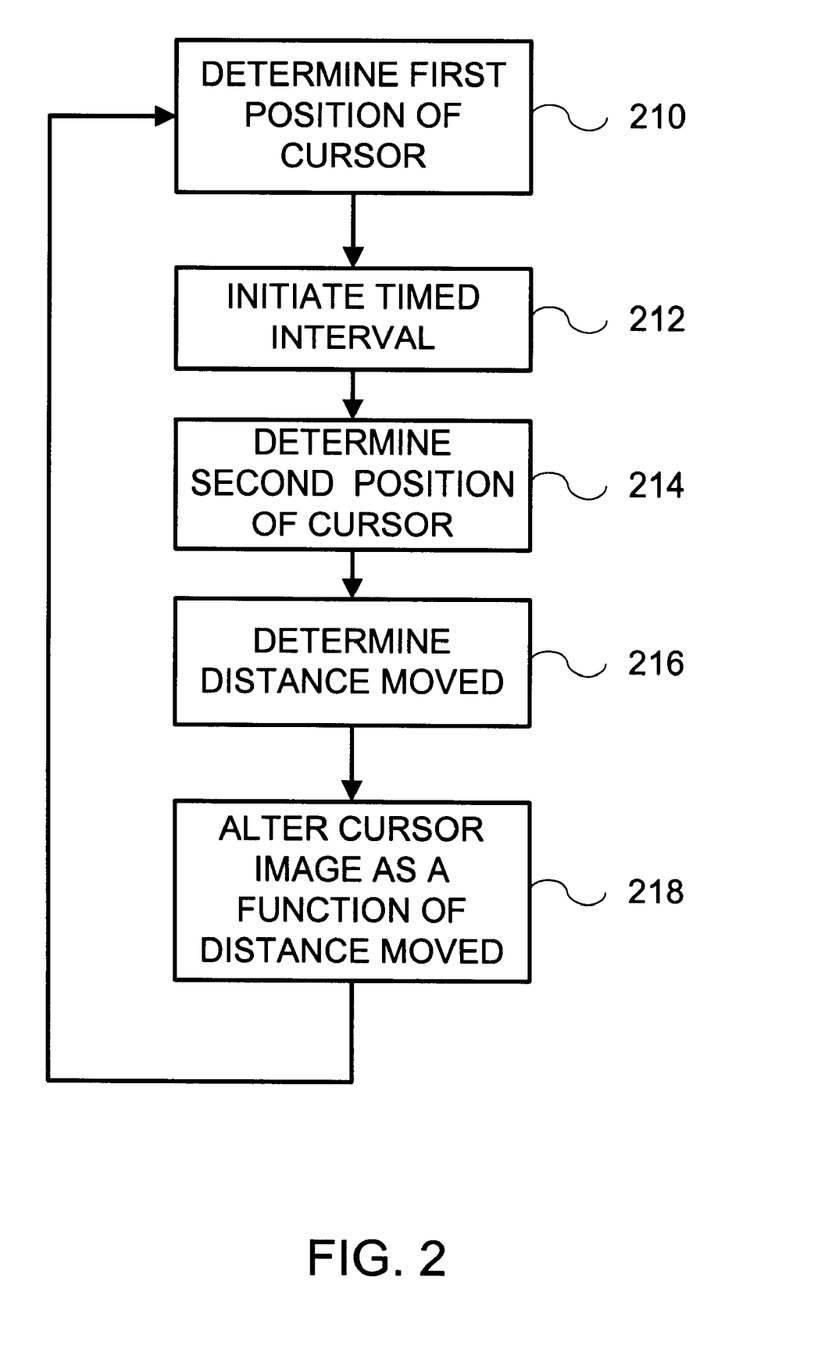
FIG. 2 is flow chart illustrating a method of altering a cursor image as a function of the distance moved over a time interval according to one embodiment of the present invention.

FIG. 2 is flow chart illustrating a method of altering a cursor image as a function of the distance moved over a timed interval according to one embodiment of the present invention. As earlier described with reference to FIG. 1B, the host computer system includes computer code that enables the determination of the cursor position on the display 105. Typically this position information relates the cursor (or its cursor image) to a display reference location, but it will be appreciated that other computer systems may utilize different referencing systems which indicate the position of the cursor image on the display.

At 210 the position information is obtained and used to determine a first position of the cursor and at 212 a timed interval is started. It will be appreciated that the first position may be an at-rest position, i.e., stationary, or if the cursor image is moving, the first position would be the location of the cursor image at the beginning of a prescribed timed interval. The first position of the cursor image is retained in a memory structure, such as random access memory, cache memory or database, or some other structure which would allow retrieval of the first position information for use in calculating the distance the cursor image is moved during the timed interval.

The timed interval may be any specified time interval, and may be established using a large variety of methods. For example, the timed interval may be a set default timed interval, it may be a timed interval that is user-defined, or it may be dynamically changed as a function of the cursor movement. As an example, the timed interval may be a millisecond. It will be appreciated that smaller time increments will produce a more seemingly continuous indication of the cursor image movement. The timed interval may be determined using a time indicator or timer already present in the host computer system, or provided as a separate timer, or may be present in another accessible system.

At the end of the timed interval, at 214, a second position of the cursor is obtained. Position information available from the host computer system can be used to determine the cursor position. At 216, the distance the cursor (or cursor image) has moved is determined as a function of the first position of cursor image and the second position of the cursor image. As will be appreciated by those skilled in the art, the determination of distance moved can be accomplished in a variety of ways, from basic algebraic equations to complex vector analysis.

At 218, the cursor image is then altered as a function of the distance moved over the timed interval. In one embodiment, the size of the cursor image is altered as a function of the distance moved so that the size of the cursor image increases with increasing distance moved. The size of the cursor image can also decrease with decreasing distance moved. Thus, when the cursor is moving quickly, the cursor image is large and thus easily located on the display; whereas when the cursor is moving slowly, the cursor image is close to its default, e.g. non-moving, size so as not to obstruct the user's view of any work product presented on the display. Following 218, the processing can return to operation 210 to repeat the processing such that the size of the cursor image is continuously altered as a function of the distance moved over a timed interval.

Figure 3:
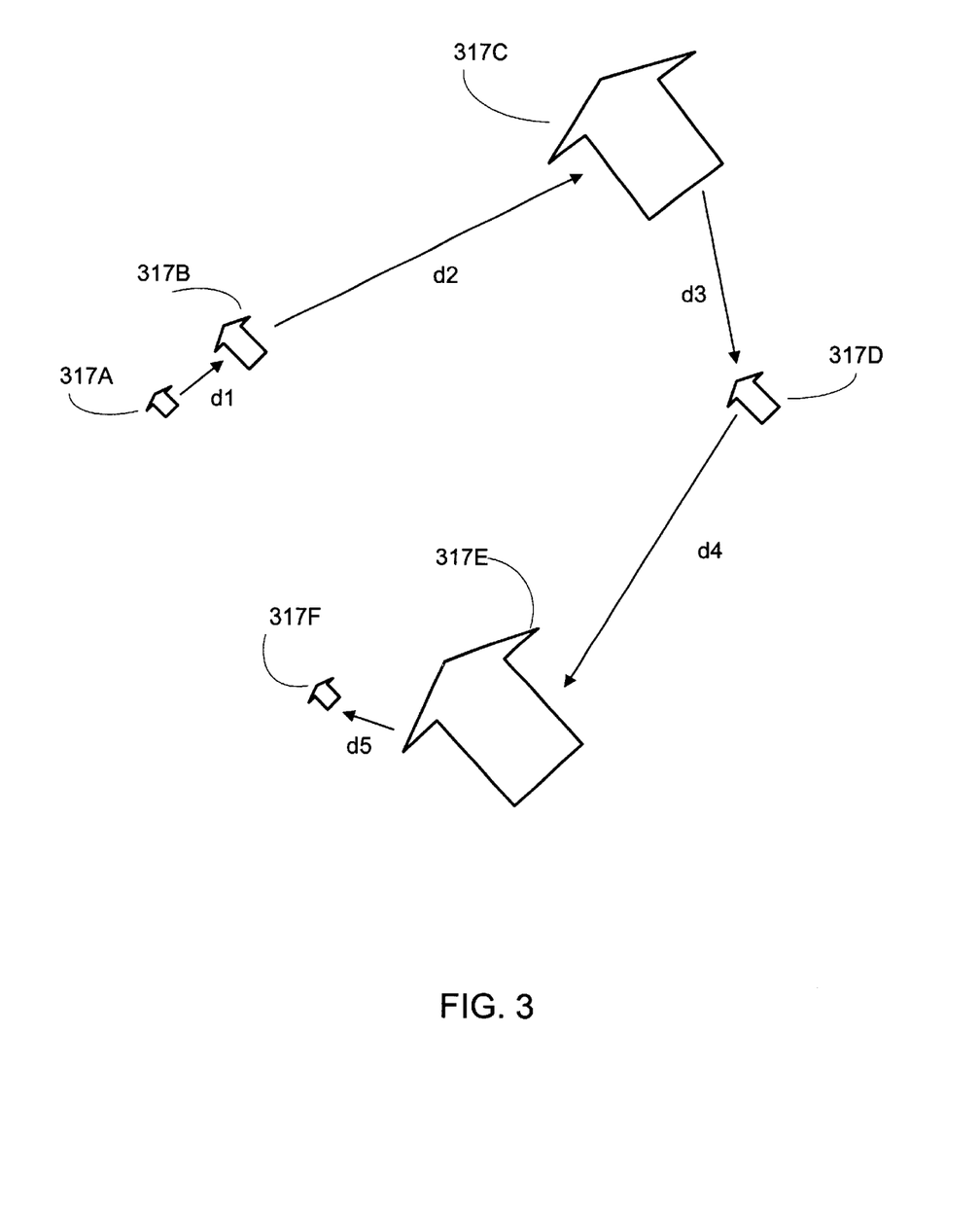
FIG. 3 is a series of graphic representations illustrating alteration of the size of a cursor image as a function of the distance moved over a time interval according to one embodiment of the present invention.

FIG. 3 is a series of graphic representations illustrating alteration of the size of a cursor image as a function of the distance moved over a time interval according to one embodiment of the present invention. FIG. 3 represents examples of how a cursor image 317 may be altered as a function of the distance the cursor (cursor image) has traveled over a sample set of five timed intervals, d1 through d5. Thus, FIG. 3 may be viewed as a time-lapsed illustration where normally only one of the cursor images would be presented to the user at a given moment in time. Thus, for example, cursor image 317A represents the cursor image at-rest at the beginning of a first time interval. The cursor image 317A is then moved a distance, d1, during the first timed interval. The cursor image 317A is then altered in size as a function of d1 and presented to the user as a larger cursor image 317B. The cursor image 317B is then moved a distance d2 during the second timed interval, which is greater than d1, and then altered in size as a function of d2 and presented to the user as an even larger cursor image 317C. The cursor image 317C is then moved a distance d3 during the third time interval, which is less than d2, and then altered in size as function of d3 and presented to the user as a somewhat smaller cursor image 317D. The cursor image 317D is then moved a distance d4 during the fourth timed interval, which is greater than d3, and then altered in size as a function of d4 and presented to the user as enlarged cursor image 317E. The cursor image 317D is then moved a distance d5 during the fifth time interval, which is less than d4, and then altered in size as function of d5 and presented to the user as a reduced cursor image 317F.

Alteration of the cursor image may be made in a variety of ways. In one embodiment, the cursor image may be altered by morphing the cursor image as a function of the distance moved. Morphing is typically a 2D mathematical interpolation of prescribed characteristics of an object. Image morphing provides a smooth and continuous appearing alteration of the image. There are a number of morphing software packages available on the market, for example, PHOTOSHOP (digital imaging software product) from Adobe Systems Incorporated, San Jose, Calif. For example, the size of the cursor image at the first position may be morphed in size as a function of the distance moved to the second position. Typically, the size of the cursor image would have a minimum size (e.g., default size) and a maximum size. Thus, to the user, the cursor image would appear to dynamically grow and shrink in size with respective increases and decreases in the distance the cursor image is moved per timed interval.

In another embodiment, rather than morphing the cursor image, the cursor image may instead be incrementally altered using intermediate cursor images associated with a particular distance moved per timed interval. These intermediate cursor images may be stored in a database, or other memory storage device in the computer system or in a peripheral device, where each intermediate cursor image is sized as a function of distance moved or range of distances moved during a timed interval. After the distance moved is determined, the intermediate cursor image associated with the distance moved would be retrieved from the database and presented on the display to the user. Of course, these intermediate cursor images can be indexed by other criteria besides distance. For example, the intermediate images can be retrieved based on speed of cursor movement.

In some graphic subsystems, it may be necessary to also load the images into other memory structures, such as matrices. For example, some graphic subsystems, such as those which utilize sprites implement the graphics using a sprite matrix which is typically a m×n array. A cursor implemented in as a sprite based image may require that the altered cursor image be implemented via the sprite matrix.

It will be appreciated that with the above embodiments, the shorter the timed interval selected, the more smoothly the alteration of the cursor image will appear to the user, as the larger the number of distance determinations will be made and used in morphing of the cursor image or in selection of intermediate cursor images.

It naturally follows that if the cursor image is altered as a function of distance moved over an interval of time, e.g., timed interval, that this can be also be viewed as altering the cursor image as a function of the speed at which the cursor image is moved. As such, the present invention provides for altering a cursor image as a function of the speed the cursor image is moved.

Figure 4:
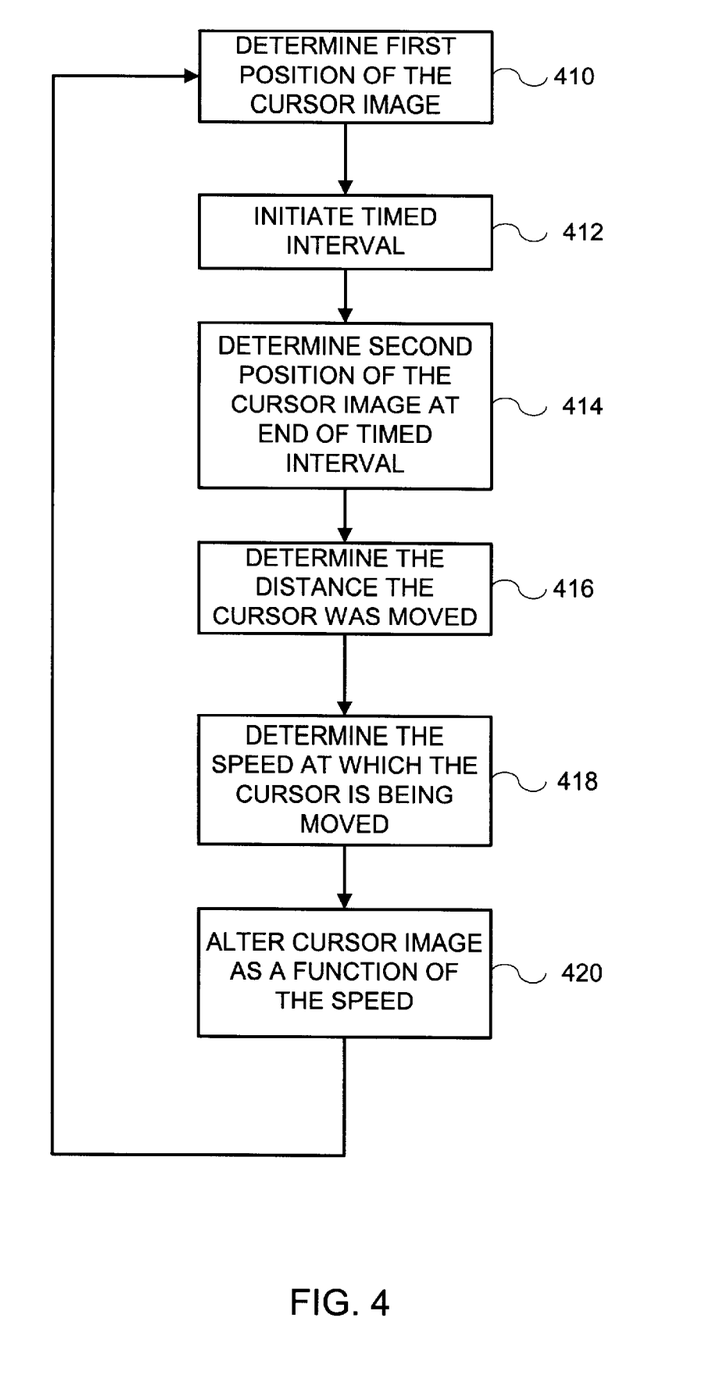
FIG. 4 is a flow chart illustrating a method of altering a cursor image as a function of the speed the cursor image is moved according to one embodiment of the present invention.

FIG. 4 is a flow chart illustrating a method of altering a cursor image as a function of the speed the cursor image is moved according to one embodiment of the present invention. At 410, a first position of the cursor image is determined and retained in a memory structure. This process is analogous to that of 210 in FIG. 2. At 412, a timed interval is initiated. At 414, when the timed interval ends, a second position of the cursor image is determined. At 416, the distance the cursor image was moved is determined. At 418, the speed at which the cursor image was moved is determined, and, at 420, the cursor image is altered as a function of the speed, and the processes repeated. The cursor image may be altered in a variety of ways, such as by morphing or use of incremental cursor images as earlier described with reference to FIGS. 2 and 3.

As with distance moved, calculation of the speed may be performed in a variety of ways. The method chosen may be any that is computationally preferred. Basically, the speed is the change in cursor image position per unit of time. By way of example, the change (Δ) in the (x,y) position of the cursor image over the timed interval (t) may be used where $d_t^2 = (\Delta x^2 + \Delta y^2)_t$, or the square root of this equation may be taken.

By increasing the size of the cursor image with increased speed, the user is aided in locating the quickly moving cursor image on the display. In addition to being able to easily locate a quickly moving cursor image, it is often desirable to know in which direction the cursor image is moving. Thus, in addition to altering the cursor image as a function of the distance moved per timed interval, or speed, the present invention provides for the cursor image to be further altered as a function of the direction of cursor image movement.

Figure 5:
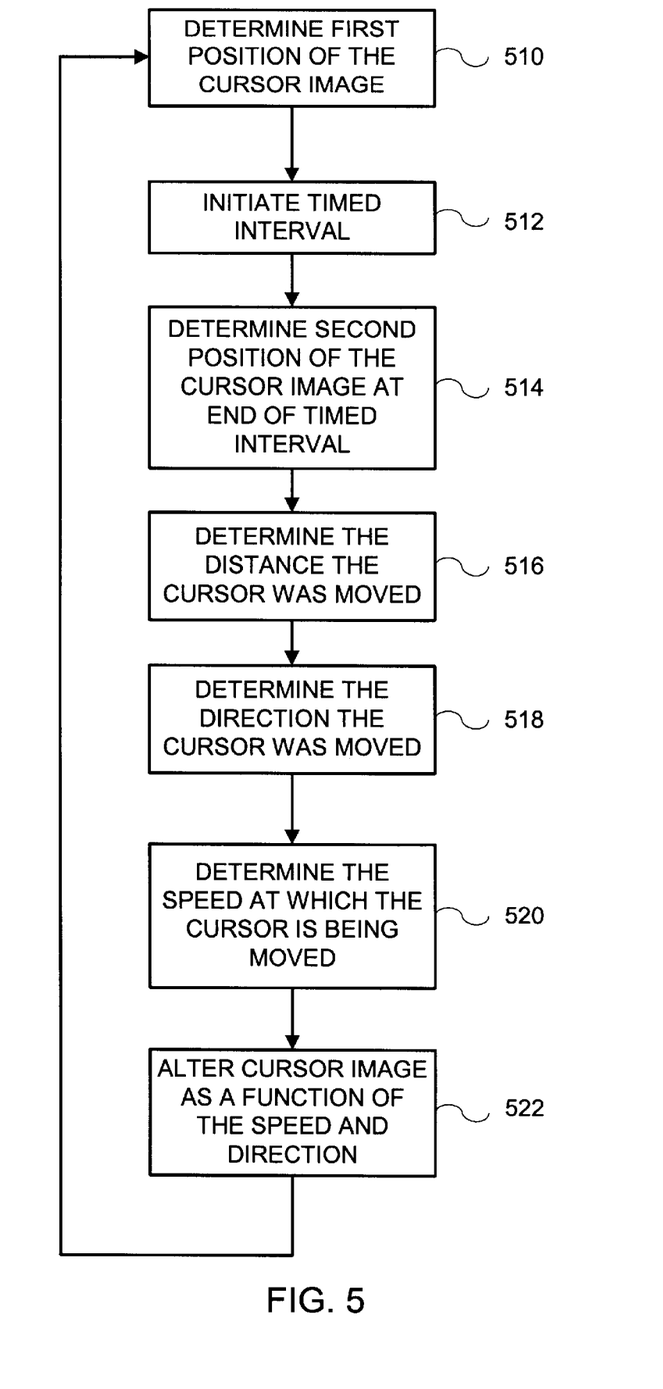
FIG. 5 is a flow chart illustrating a method of altering a cursor image as a function of the speed and direction the cursor image is moved according to one embodiment of the present invention.

FIG. 5 is a flow chart illustrating a method of altering a cursor image as a function of the speed and direction the cursor image is moved according to one embodiment of the present invention. At 510, similar to FIGS. 2 and 4, a first position of the cursor image is determined and retained for later access. At 512, the timed interval is initiated. At 514, the timed interval ends and a second position of the cursor image is determined and retained. At 516 the distance the cursor image was moved during the timed interval is determined, and, at 518, the direction the cursor image was moved from the first to the second position is determined.

As with distance, determination of the direction of the movement is well known to those skilled in the art and may be determined by any method that is computationally preferred. For example, the directional information may be obtained directly from the distance moved calculations or may be independently computed using (x,y) position information or vector algorithms. Further, the cursor image position information may be used to provide additional information to allow cursor image to be flipped and/or rotated or to otherwise alter the cursor image to indicate the direction of the cursor image movement, such as in morphing instructions or in intermediate cursor image selection.

At 520, the speed at which the cursor image is being moved is determined, and at 522, the cursor image is altered as a function of the speed and direction at which the cursor image was moved from the first position to the second position. For example, when the cursor image is moving right, the cursor image may be a dog that "points" to the right. When the cursor image is moving up, the cursor image may be a bird that "points" up. Indication of the direction of movement can be accomplished through morphing of the cursor image or through use of intermediate cursor images which are associated with speed and directional information, or by alteration of the intermediate cursor images that are associated with speed.

It will be appreciated that it is not necessary that the direction information be calculated after the distance moved and may instead be computed after the speed determination.

Figure 6:
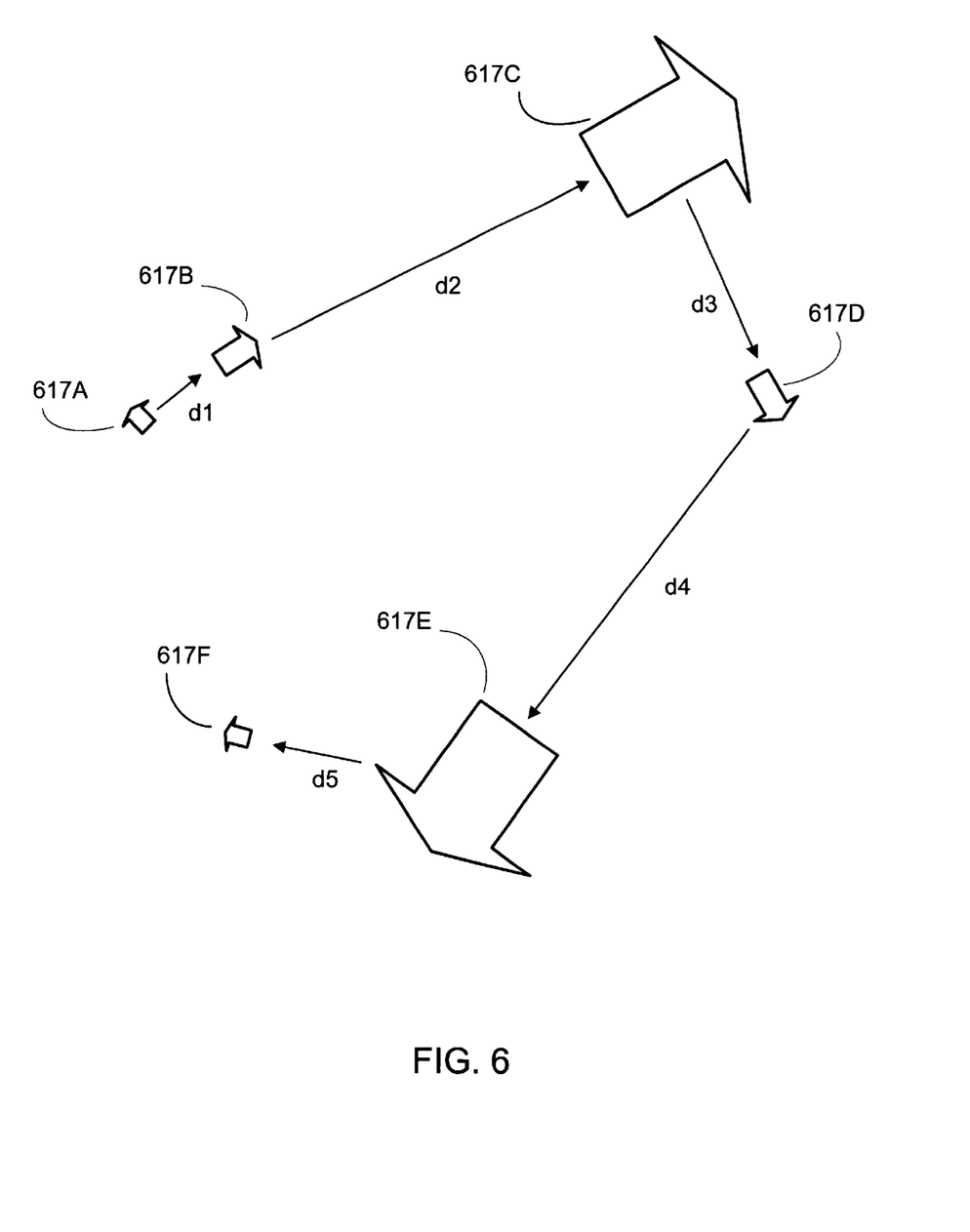
FIG. 6 is a series of graphic representations illustrating alteration of the cursor image as a function of the speed and direction the cursor image is moved according to one embodiment of the present invention.

FIG. 6 is a series of graphic representations illustrating alteration of the cursor image as a function of the speed and direction the cursor image is moved according to one embodiment of the present invention. FIG. 6 represents examples of how a cursor image may be altered as a function of the speed and direction moved over a sample set of five timed intervals. Thus, as earlier described with reference to FIG. 3, FIG. 6 may be viewed as a time-lapse illustration where normally only one of the views would be presented to the user at a single moment of time. For example, cursor image 617A represents the cursor image at-rest at the beginning of a first time interval. The cursor image 617A is then moved at speed 1 in the indicated direction during the first timed interval. The cursor image 617A is altered in size as a function of speed 1 and the direction and presented to the user as cursor image 617B, a larger, directional cursor image. The cursor image 617B is then moved at speed 2 in the indicated direction during the second timed interval and altered in size as a function of speed 2 and the direction and presented to the user as cursor image 617C, a larger, directional cursor image. The cursor image 617C is then moved at speed 3 in the indicated direction during the third timed interval and altered in size as function of speed 3 and the direction and presented to the user as cursor image 617D, a smaller, directional cursor image. Cursor image 617D is altered in size as a function of speed 4 and the indicated direction and presented to the user as a larger, directional cursor image 617E, and cursor image 617E is altered in size as function of speed 5 and the indicated direction to a smaller, directional cursor image 617F.

In the above-described embodiments, the processes are continually repeated following the determination of the distance moved, speed, and/or direction moved regardless of whether the cursor image was even moved from an at-rest position. In some applications, it may be desirable to conserve processing resources by determining if the cursor image has even been moved from its at-rest position, some specified distance or speed, before executing all the processes.

Figure 7:
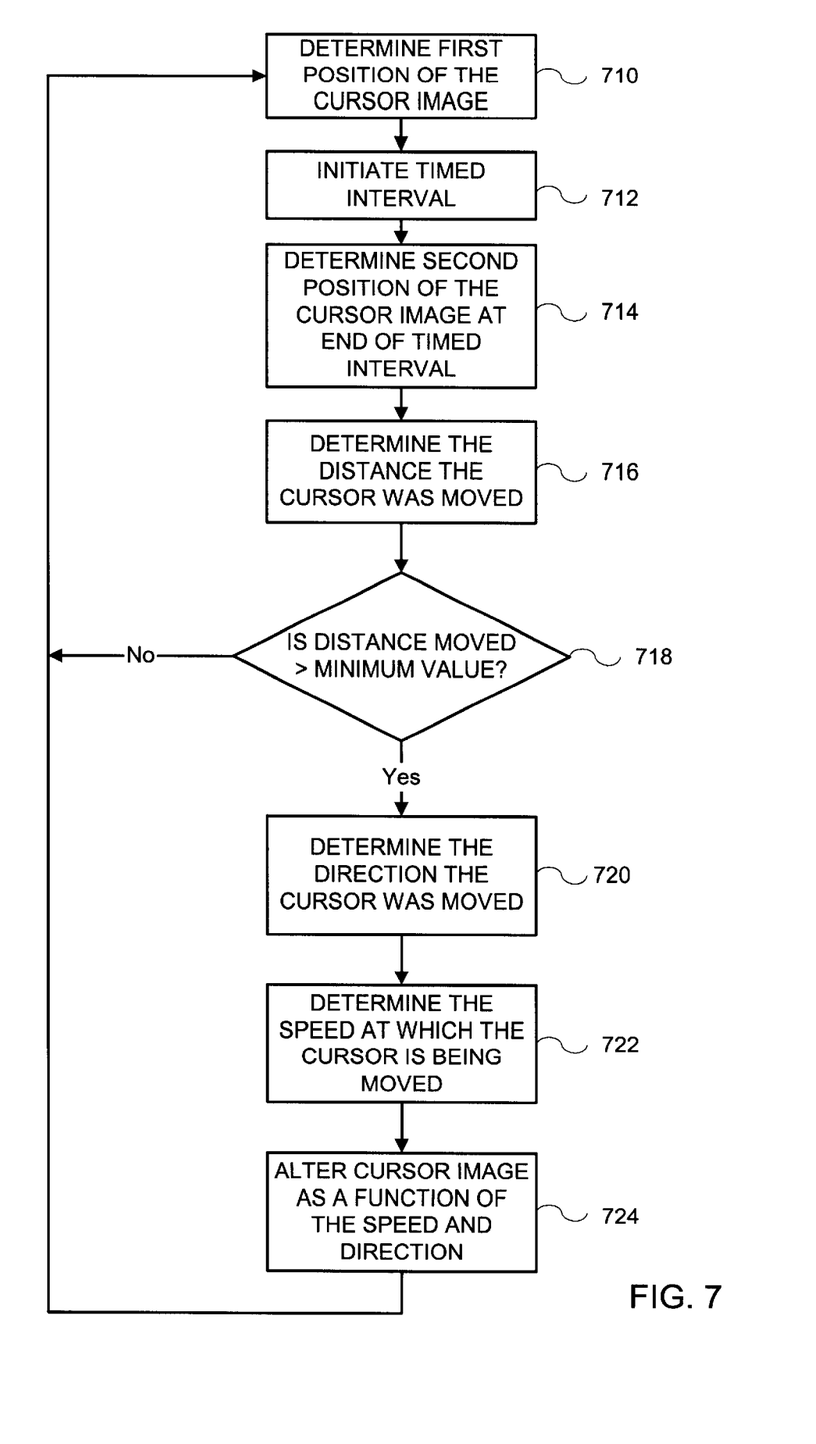
FIG. 7 is flow chart illustrating a method of altering an at-rest cursor image as a function of the speed and direction the cursor image is moved dependent upon whether the cursor image has been moved above a threshold distance value according to one embodiment of the present invention.

FIG. 7 is flow chart illustrating a method of altering an at-rest cursor image as a function of the speed and direction the cursor image is moved dependent upon whether the cursor image has been moved above a threshold distance value according to one embodiment of the present invention. Processes 710 through 716 are somewhat analogous to those of processes 510 through 516 of FIG. 5 except that they apply only to the at-rest cursor image. At 718, the distance moved is compared to a threshold distance moved value. If the distance moved is less than the threshold value, the process flow returns to process 710, and the default cursor image remains unaltered. If the distance moved is greater than the threshold value, the process flow continues to processes 720 through 722 similar to those described with reference to processes 518 through 522 of FIG. 5.

It will further be appreciated that this initial determination of movement from the default position may be implemented in any of the above earlier-described embodiments.

The above-described embodiments of the present invention allow a user to more easily locate a cursor image on a display by increasing the size of the cursor image with increasing speed and by further providing for an indication of the direction of the movement of the cursor image. In other contexts, it may be desirable to provide further alteration of the cursor image to enhance the user's ability to locate the cursor image. For example, changing the form, e.g., the identity, of the cursor image.

Figure 8:
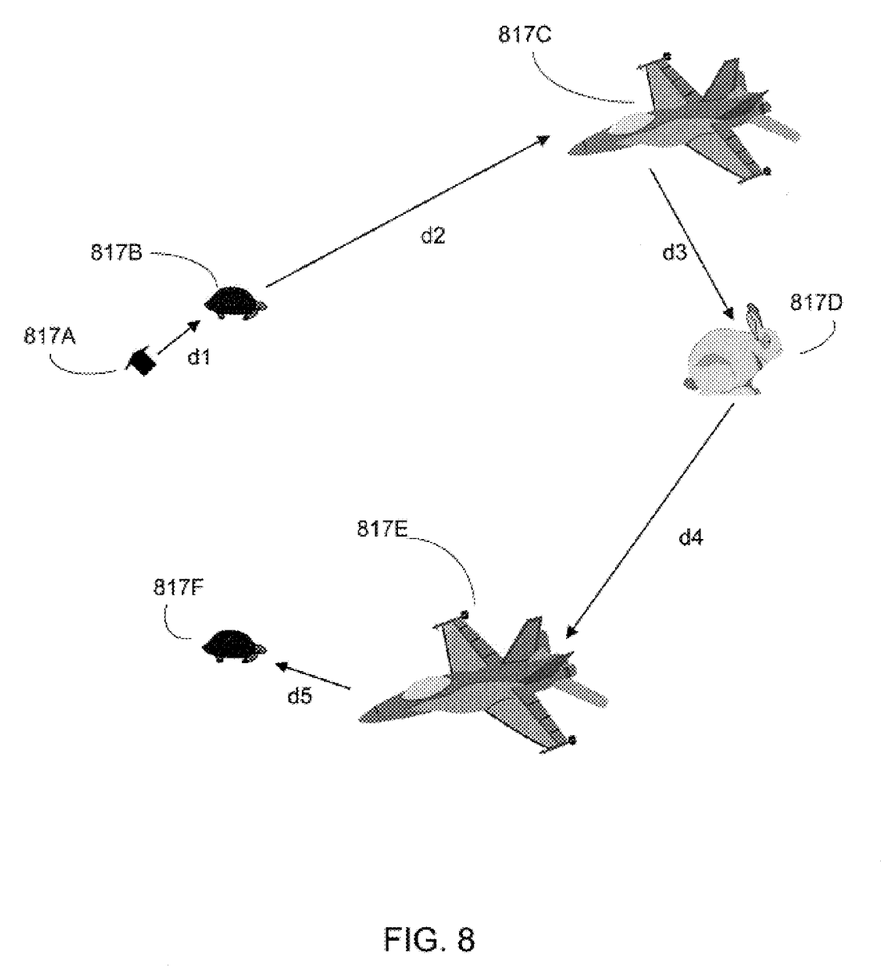
FIG. 8 is a series of graphic representations illustrating alteration of the cursor image as a function of the speed and direction the cursor image is moved according to one embodiment of the present invention.

FIG. 8 is a series of graphical representations illustrating the alteration of a cursor image as a function of the speed the cursor is moved according to one embodiment of the present invention. In FIG. 8, the size and form of the cursor image is altered as a function of speed, for perhaps a child user. For example, the cursor image may be a default cursor image 817A when at-rest. At speed 1, the cursor image 817A is altered to cursor image 817B, which is a turtle. At speed 2, the cursor image 817B is altered to cursor image 817C, a fighter jet. At speed 3, the cursor image 817C is altered to cursor image 817D, a rabbit. At speed 4, the cursor image 817D is altered to cursor image 817E, a fighter jet. At speed 5, the cursor image 817E is altered to the cursor image 817F, a turtle. If desired, the cursor image may also be altered to indicate the direction of movement.

The present invention enables a user to more easily locate a cursor image on single or multi-screen display by increasing the size of the cursor image as the speed of movement increases. The above embodiment may be useful in not only providing ease in locating the cursor image on the display, but also allows the form of the cursor image to be altered to provide a secondary association. In this instance, the forms were changed to provide a secondary association with different speeds, and to provide interesting subject matter for a child user. It will be appreciated that a large variety of other secondary meanings can be associated with different cursor image forms. As with the earlier described embodiments, this embodiment may also be effected using morphing or intermediate cursor images.

In other applications, it may be advantageous to further alter the cursor image in color, and/or to have the cursor image flash as a function of the distance moved, and or speed. For example, the at-rest cursor image may be red, and then change to yellow and green with increasing speed, and the reverse with decreasing speed. As another example, an at-rest cursor image may not flash, but may begin flashing at a rate set as a function of the distance moved or speed.

In still other applications, it may be advantageous to combine an aural cue, e.g., a sound indicator, to indicate the position of the cursor. In one example, a sound can signify the position of the cursor above a certain threshold movement, e.g., a threshold speed of movement of the cursor. For example, a tone pitch can be proportional to the position on the cursor vertically. A high pitch indicating a cursor near the top of the screen and a low pitch indicating a cursor near the bottom of the screen. The left/right positioning of the cursor can be indicated by the "richness" of the tone from a simple tone on the left to a complex of harmonics and uncorrelated tones near the vertically set pitch for a chorus effect on the right. Another example, would be to use two tones within two non-overlapping ranges with one range, for example, the lower one, with a tone indicating left to right and a tone in the upper range indicating bottom to top.

The aural cue may be used independently or in conjunction with any of the earlier described embodiments. The sound can be tied to the object used for the cursor such as a chirping sound indicating the position of the bird. Another example, would be a flying saucer cursor where the pitch and richness of a whirring sound also signifies position.

The position of the cursor for this purpose is, as earlier described, easily obtainable and is already used for a variety of tasks. The sound can be generated by computation in the central processing unit or it may be generated in a sound card, specialized sound integrated circuit or on other processors or circuit that may be available in the computer system.

It will be appreciated that in other embodiments, any, some or all of the above features may be incorporated with the alteration of the cursor image as a function of the distance moved or speed at which the cursor image is moved.

In the following description, numerous specific details are set forth in order to provide a thorough understanding of the present invention. It will be appreciated, however, to one skilled in the art, that the present invention may be practiced without some or all of these specific details. In other instances, well-known process operations have not been described in detail in order not to unnecessarily obscure the present invention.

What is claimed is:

1. A method for altering a cursor image presented on a display, the method comprising:

determining a first position of a cursor image on a display;

initiating a timed interval;

determining a second position of the cursor image on the display at the end of the timed interval;

determining the distance moved based upon the first position of the cursor image and the second position of the cursor image; and altering the cursor image presented on the display as a function of the distance moved, wherein the appearance of the cursor image is altered in size as a function of the distance moved.

2. The method of claim 1 wherein the size of the cursor image increases with increasing distance moved.

3. The method of claim 2 wherein the size of the cursor image decreases with decreasing distance moved.

4. The method of claim 1 wherein the appearance of the cursor image is further altered in form as a function of the distance moved.

5. The method of claim 1 wherein the appearance of the cursor image is further altered in color as a function of the distance moved.

6. The method of claim 1 wherein the appearance of the cursor image flashes as a function of the distance moved.

7. The method of claim 1 further comprising:

determining the direction of movement based upon the first position of the cursor image and the second position of the cursor image; and further altering the appearance of the cursor image presented on the display to indicate the direction of movement.

8. The method of claim 1 wherein the appearance of the cursor image is altered by morphing the cursor image.

9. The method of claim 1 wherein the appearance of the cursor image is altered by presenting an intermediate cursor image associated with distance moved.

10. A method for altering a cursor image presented on a display, the method comprising:

determining a first position of a cursor image on a display;

initiating a timed interval;

determining a second position of the cursor image on the display at the end of the timed interval;

determining the distance moved based upon the first position of the cursor image and the second position of the cursor image;

altering the cursor image presented on the display as a function of the distance moved; and generating an aural cue with the cursor image, wherein said aural cue further indicates the position of the cursor image relative to the display.

11. A method for altering a cursor image presented on a display, the method comprising:

determining a first position of a cursor image on a display;

initiating a timed interval, the timed interval having a termination;

determining a second position of the cursor image on the display at the termination of the timed interval;

determining the distance the cursor image is moved from the first position to the second position;

determining the speed at which the cursor image is moved from the first position to the second position; and altering the appearance of the cursor image presented on the display as a function of the speed.

12. The method of claim 11 wherein the appearance of the cursor image is altered in size as a function of the speed.

13. The method of claim 12 wherein the size of the cursor image increases with increasing speed.

14. The method of claim 13 wherein the size of the cursor image decreases with decreasing speed.

15. The method of claim 12 wherein the cursor image is further altered in form as a function of the speed.

16. The method of claim 12 wherein the cursor image is further altered in color as a function of the speed.

17. The method of claim 12 wherein the cursor image flashes as a function of the speed.

18. The method of claim 11 wherein the appearance of the cursor image is altered by morphing the cursor image as a function of the speed.

19. The method of claim 11 wherein the appearance of the cursor image is altered in appearance by presenting an intermediate cursor image associated with the determined speed.

20. The method of claim 11 further comprising:
   determining the direction of movement of the cursor image based upon the first position of the cursor image and the second position of the cursor image; and
   further altering the appearance of the cursor image presented on the display to indicate the direction of movement.

21. The method of claim 11 further comprising generating an aural cue, wherein said aural cue further indicates the position of the cursor image relative to the display.

22. A method for altering a cursor image presented on a display, the method comprising:
   determining a first position of a cursor image on a display;
   initiating a timed interval, the timed interval having a termination;
   determining a second position of the cursor image on the display at the termination of the timed interval;
   determining the distance the cursor image is moved from the first position to the second position;
   determining the direction the cursor image is moved from the first position to the second position;
   determining the speed at which the cursor image is moved from the first position to the second position; and
   altering the appearance of the cursor image presented on the display as a function of the speed and direction.

23. The method of claim 22 wherein the appearance of the cursor image is altered in size as a function of the speed.

24. The method of claim 23 wherein the cursor image is further altered in form as a function of the speed.

25. The method of claim 23 wherein the cursor image is further altered in color as a function of the speed.

26. The method of claim 23 wherein the cursor image flashes as a function of the speed.

27. The method of claim 22 wherein the size of the cursor image increases with increasing speed and decreases with decreasing speed.

28. The method of claim 22 wherein the appearance of the cursor image is altered by morphing the cursor image as a function of the speed.

29. The method of claim 22 wherein the appearance of the cursor image is altered in appearance by presenting an intermediate cursor image associated with the determined speed.

30. The method of claim 22 further comprising generating an aural cue, wherein said aural cue further indicates the position of the cursor image relative to the display.

31. A method for altering a cursor image presented on a display, the method comprising:
   determining a first position of a cursor image on a display;
   initiating a timed interval, the timed interval having a termination;
   determining a second position of the cursor image on the display at the termination of the timed interval;
   determining the distance the cursor image is moved from the first position to the second position;
   determining if the distance moved is greater than a minimum specified value;
   if the distance moved is greater than the minimum specified value, determining the direction the cursor image is moved from the first position to the second position;
   if the distance moved is greater than the minimum specified value, determining the speed at which the cursor image is moved from the first position to the second position; and
   if the distance moved is greater than the minimum specified value, altering the appearance of the cursor image presented on the display as a function of the speed and direction.

32. A computer readable medium containing program code for altering a cursor image presented on a display, said computer readable medium comprising instructions for:
   determining a first position of a cursor image on a display;
   initiating a timed interval, the timed interval having a termination;
   determining a second position of the cursor image on the display at the termination of the timed interval;
   determining the distance the cursor image is moved from the first position to the second position;
   determining the speed at which the cursor image is moved from the first position to the second position; and
   altering the appearance of the cursor image presented on the display as a function of the speed.

33. The computer readable medium of claim 32 wherein the appearance of the cursor image is altered in size as a function of the speed.

34. The computer readable medium of claim 32 wherein the size of the cursor image increases with increasing speed.

35. The computer readable medium of claim 34 wherein the size of the cursor image decreases with decreasing speed.

36. The computer readable medium of claim 32 further comprising instructions for:
   determining the direction of movement of the cursor image based upon the first position of the cursor image and the second position of the cursor image; and
   further altering the appearance of the cursor image presented on the display to indicate the direction of movement.

37. The computer readable medium of claim 32 further comprising instructions for generating an aural cue, wherein said aural cue further indicates the position of the cursor image on the display.

* * * * *